April 19, 1966 N. SZEREMY 3,247,469
TEMPERATURE COMPENSATED VERTICAL SWEEP CIRCUIT
Filed Oct. 18, 1963
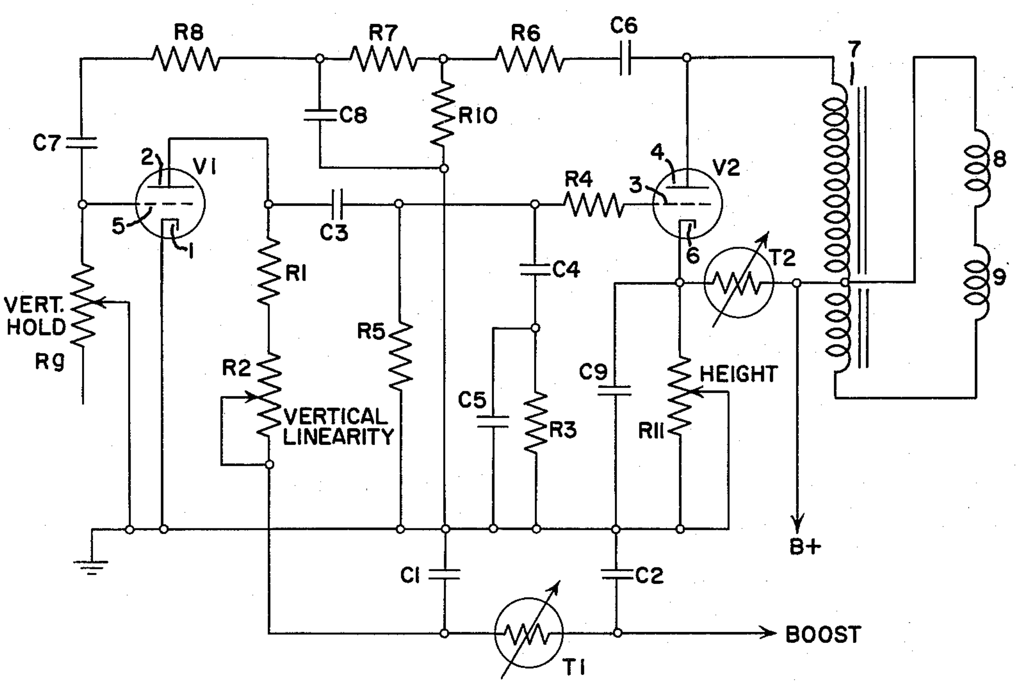
INVENTOR:
NORMAN SZEREMY.
BY Frank J. Thompson
HIS ATTORNEY.

United States Patent Office 3,247,469
Patented Apr. 19, 1966

3,247,469
TEMPERATURE COMPENSATED VERTICAL SWEEP CIRCUIT

Norman Szeremy, Syracuse, N.Y., assignor to General Electric Company, a corporation of New York
Filed Oct. 18, 1963, Ser. No. 317,371
2 Claims. (Cl. 331—144)

The present invention relates to a vertical sweep circuit and more specifically to an improved temperature compensated vertical sweep circuit.

It is common practice to utilize a multi-vibrator circuit for the production of the saw-tooth currents necessary for vertical deflection of the electron beam in a television picture tube. As the ambient temperature of such a multi-vibrator increases during receiver warm-up, corresponding increases in resistance of various components of the circuit cause a decrease in magnitude of the sweep voltage and thus in picture size. The magnitude of the sweep voltage is decreased due to the lowering of the B+ by the increased resistance of the power transformer, filter choke and output transformer and also by the lowering of the efficiency of the output transformer and deflection windings. Thus, some form of temperature compensation is necessary to prevent objectionable picture shrinkage.

Prior art approaches toward providing such compensation have not proved entirely satisfactory. One such approach utilizes a low value thermistor connected in series with the vertical windings of the deflection yoke. As the ambient temperature rises the thermistor resistance decreases, thereby increasing the efficiency of the output stage and compensating for picture shrinkage. However, such an approach has two basic disadvantages. First, such an approach is inefficient since substantial power will be consumed by the thermistor. Further, such an approach is incompatible with present high efficiency yokes which necessitate the use of very low resistance value thermistors which are presently unavailable.

Another approach toward temperature compensation utilizes a thermistor in the plate circuit of the discharge tube to thereby change the plate load impedance or preferably the operating voltage of the tube to increase the amplitude of the saw-tooth coupled to the grid of the driver tube as temperature increases. Although such an approach can provide reasonably good compensation, it is found that since various sections of the circuit exert more effect on certain portions of the raster than on others, the use of a single compensating element in this manner while capable of providing perfect compensation at one portion of the raster, provides over-compensation for another portion.

Prior attempts have also been made utilizing circuits having a pair of thermistors to effect compensation. In one such circuit, a thermistor is located in the plate circuit of the discharge tube while a second thermistor is located in the feedback circuit between the plate of the driver and the grid of the discharge tube. Although such an approach is satisfactory when a linearity control is provided in the grid circuit of the driver tube, if linearity is controlled in the plate circuit of the discharge tube, as is desirable to isolate the linearity control from the height control, over-compensation occurs.

The above prior art disadvantages have been overcome by the temperature compensated sweep circuit of the present invention.

Accordingly, an object of the present invention is to provide an improved vertical sweep circuit for a television receiver.

Another object is to provide an improved temperature compensated vertical sweep circuit.

Still another object is to provide a temperature compensated vertical sweep circuit wherein over-compensation is prevented.

A further object is to provide temperature compensation of a vertical sweep circuit while maintaining isolation between linearity and height controls.

These and other objects are achieved in one embodiment of the invention by the provision of a multi-vibrator sweep circuit circuit employing a pair of thermistors to effect temperature compensation. A first thermistor is located in the plate circuit of the discharge tube and serves to increase the voltage available at the plate of the tube as ambient temperature increases. The second thermistor is connected between the B+ supply and the cathode of the driver tube, thereby serving to control the bias and to shift the operating point of the tube to prevent over-compensation which would occur if the first thermistor alone is used.

The novel and distinctive features of the invention are set forth in the appended claims. The invention itself, together with further objects and advantages thereof may best be understood by reference to the following description and accompanying drawing in which:

The single figure is a schematic representation of a preferred embodiment of the improved vertical sweep circuit of the present invention.

Referring to the figure, there is shown a multi-vibrator vertical sweep generator which is temperature compensated through the use of a pair of thermistors. The circuit comprises a saw-tooth discharge generator tube V1 having its cathode 1 grounded and its anode 2 connected to the boost supply through resistance R1, potentiometer R2 and thermistor T1. Resistance R1 and potentiometer R2 serve as load resistances for the discharge tube V1 while thermistor T1 servesd to increase the voltage at the anode 2 as the ambient temperature increases. The potentiometer R2 can be varied to affect vertical linearity. Capacitors C1 and C2 are respectively connected from opposite ends of thermistor T1 to ground, thereby serving in conjunction with thermistor T1 as a filter to decouple the boost circuitry from the multivibrator.

The anode 2 of tube V1 is connected through coupling capacitor C3 to a pulse forming network comprised of capacitors C4 and C5 and resistance R3. The pulse forming network is connected to the grid 3 of driver tube V2 through a parasitic suppressor resistance R4, the pulse forming network serving to develop a modified saw-tooth wave at the grid 3. The tube V2 is operated as a class A amplifier to reproduce the modified saw-tooth at anode 4. A grid return resistance R5 is also provided in the grid circuit of tube V2.

A feedback circuit is connected from the anode 4 of the driver tube V2 to the grid 5 of discharge generator tube V1. The feedback circuit comprises serially connected resistances and capacitances C6, R6, R7, R8, C7, and potentiometer R*g* in conjunction with resistance R10 and capacitance C8 which are returned to ground from opposite ends of resistance R7. Components C6, R6. and R*g* in combination serve as a differentiator to remove the low frequency components from the modified saw-tooth wave present at the anode 4 of the driver tube V2 so as to provide a feedback pulse of an optimum shape. Resistances R7 and R8 in addition to determining the amplitude of the feedback signal serve in conjunction with capacitor C8 to prevent undesired signals from the horizontal sweep circuit from being coupled through the vertical deflection coils to the grid 5 of discharge tube V1. Capacitance C7 in conjunction with potentiometer R*g* acts to define the free running frequency of the multivibrator, potentiometer R*g* being a vertical hold control which is varied to lock the multi-vibrator into synchronization with pulses which are coupled from the vertical integrating circuit (not shown) to the anode 2 of tube V1 or the grid 3 of tube V2.

The cathode 6 of driver tube V2 is connected to ground through a potentiometer R11 which serves as a height control by controlling the bias of the tube, a by-pass capacitor C9 being connected in shunt with the potentiometer R11. Thermistor T2 is connected between the cathode 6 of tube V2 and the B+ supply, the thermistor serving to change the current flow through the resistance R11 as temperature varies to control the operating point of tube V2.

A standard autotransformer 7, which serves to couple the multi-vibrator to the vertical deflection windings 8 and 9 of the deflection yoke, is connected in the plate circuit of the driver tube V2.

Although the operation of the conventional multi-vibrator circuit employed in this invention is well known, a brief summary of such operation is given to allow a better understanding of the temperature compensation achieved by the present invention. As noted, the discharge tube V1 serves as a saw-tooth discharge generator. The operation can most easily be understood by assuming initially that the plate current of the tube V1 is cut-off by a negative voltage at the grid 5. The negative voltage is developed by causing the grid 5 to draw grid current thereby charging the capacitors of the feedback network. The negative voltage thus stored on the capacitors of the feedback network slowly leaks off through the vertical hold potentiometer R9 to ground. During the time that the tube V1 is cut-off, capacitors C4 and C5 in the pulse forming network and coupling capacitor C3 will be charged in saw-tooth fashion from the boost supply through thermistor T1, vertical linearity potentiometer R2 and load resistance R1. By the use of the pulse shaping network comprised of capacitance C4 and C5 and resistance R3, a modified saw-tooth is developed which is coupled to the grid 3 of tube V2. The modified saw-tooth voltage waveform is necessary to assure a linear deflection of the cathode ray beam since the deflection windings present an impedance of inductive character.

After a prescribed period, the negative voltage on the grid 5 of the tube V1 leaks off through $R_g$ to such a degree that tube V1 conducts slightly. At that time, the capacitors C4 and C5 of the pulse shaping network and coupling capacitor C3 begin to discharge through the tube V1, the grid voltage of this tube sharply decreases, and an abrupt positive pulse will appear on the plate. The positive pulse is coupled by the above-described feedback network to the grid 5 of tube V1 so as to cause the tube V1 to become even more conductive. In this manner, a regenerative action is realized which results in a very rapid discharge of capacitors of the pulse shaping network to complete the modified saw-tooth waveform. When the pulse shaping capacitors C4 and C5 are discharged, the positive pulse appearing at the plate 4 of tube V2 no longer exists and the grid current which is caused by the presence of the positive feedback pulse on the grid 5 of tube V1 again allows the capacitors of the feedback circuit to charge so as to establish plate current cut-off in the tube V1. Thus, the saw-tooth cycle again commences.

From the foregoing discussion, it is seen that the frequency of oscillation of the multi-vibrator is inherently a function of the time required for the negative cut-off voltage at the grid 5 of tube V1 to leak-off and allow conduction of the tube. This length of time is controlled by adjustment of the vertical hold potentiometer R9 in such a manner that the free running frequency of the multi-vibrator is brought close to the frequency of the arriving sync pulses so that lock in between the multi-vibrator and the sync pulses is effected.

The vertical linearity of the circuit is controlled by varying potentiometer R2 which, as a part of the plate load of tube V1, serves to define the rate at which the capacitors C4 and C5 charge to thereby control the saw-tooth coupled to the grid 3 of tube V2. Height control is effected by varying potentiometer R11 to change the operating point of the tube V2, the height control having a minimal effect on linearity since tube V2 is always operated in its linear region as a class A amplifier. Although there will by necessity be some degree of interaction between the linearity and height controls, it is desirable to minimize this interaction as much as possible to allow variation of one control without the necessity of varying the other. For this reason, it is desirable to locate the vertical linearity control in the plate circuit of the saw-tooth discharge generator tube and the height control in the cathode circuit of the driver tube as in the multi-vibrator circuit employed in the present invention.

In accordance with the present invention, temperature compensation of such a multi-vibrator sweep circuit is achieved by the action of thermistors T1 and T2. As the resistance of thermistor T1 decreases with temperature, the resistance of the series charging path of the capacitors C4 and C5 is decreased, thereby causing a modified saw-tooth of increased amplitude to be coupled to the grid 3 of the driver tube V2. In this manner an increased amplitude saw-tooth output is generated to maintain a constant picture size.

However, the use of T1 alone has been found to be insufficient to provide the desired compensation. This is true since various parts of the circuit affect various portions of the sweep to a greater degree than do other parts of the circuit. Thus, for example, it has been found that if T1 is chosen to provide perfect compensation at the bottom of the raster, the top of the raster will be over-compensated and expand during warm-up. In accordance with the present invention such over-compensation is prevented by the use of a second thermistor T2 connected between the B+ supply and the cathode 6 of the tube V2. The thermistor T2 completes a current path from the B+ supply through the height control potentiometer R11 to ground. An increase in temperature thus causes the resistance of thermistor T2 to decrease thereby increasing the current flowing through the height control potentiometer R11. Thus, the voltage at the cathode 6 of the tube V2 becomes more positive as the current through potentiometer R11 increases. By control of the current in this manner the voltage at the cathode 6 of tube V2 is changed to select an operating point for the tube which prevents over-compensation at any portion of the raster.

Thus it will be seen that as the ambient temperature of the multi-vibrator increases prior to the reaching of thermal equilibrium, the resistance of the thermistors T1 and T2 will decrease to provide complete compensation for increased resistance of other components of the multi-vibrator. By the location of the compensating thermistors in accordance with the present invention, complete temperature compensation can be achieved while maintaining the desired isolation between vertical linearity and height controls. Thus, the present invention is an improvement over prior art systems wherein complete compensation could be achieved only at the expense of locating the vertical linearity control in the grid circuit of the driver tube thereby causing a great deal of interaction between the two controls.

A sweep circuit compensated in accordance with the present invention has been found to be extremely stable over reasonably large temperature changes without the necessity of frequent adjustment of the various controls. At the same time, the circuit of the present invention is compatible with the use of high efficiency deflection yokes and serves to minimize power supply requirements by preventing the reduction of scan efficiency.

Although by necessity specific circuit parameters will vary in accordance with individual requirements, the following circuit values have been found to be completely satisfactory in one successful embodiment of this invention:

Thermistors:

| | |
|---|---|
| T1 | 0.5 megohm. |
| T2 | 1 megohm. |

Resistors:

| | |
|---|---|
| R1 | 1.5 megohms. |
| R2 | 4 megohms. |
| R3 | 47K. |
| R4 | 100 ohms. |
| R5 | 1 megohm. |
| R6 | 56K. |
| R7 | 68K. |
| R8 | 47K. |
| Rg | 1 megohm. |
| R10 | 100K. |
| R11 | 2K. |

| Capacitors: | Microfarad |
|---|---|
| C1 | 0.1 |
| C2 | 0.015 |
| C3 | 0.056 |
| C4 | 0.022 |
| C5 | 0.0039 |
| C6 | 0.015 |
| C7 | 0.0039 |
| C8 | 0.0008 |
| C9 | 100 |

Although the invention has been described with respect to certain specific embodiments, it will be appreciated that modifications and changes may be made by those skilled in the art without departing from the spirit of the invention. Therefore, it is intended by the appended claims to cover all such modifications and changes that fall within the true spirit and scope of the invention.

What is claimed as new and desired to be secured by Letters Patent of the United States is:

1. A temperature compensated vertical sweep circuit for a television receiver comprising:

(a) first and second electron discharge devices, each discharge device having a control grid, cathode and plate, (i) the plate of said first discharge device being coupled to the grid of said second discharge device;

(b) feedback means connected between the plate of said second discharge device and the grid of said first discharge device;

(c) pulse forming means connected to the grid of said second discharge device;

(d) first resistive means connected to the cathode of said second discharge device;

(e) second and third resistive means exhibiting a negative temperature coefficient of resistance, (i) said second resistive means connecting a source of D.C. voltage to the plate of said first discharge device, and (ii) said third resistive means connecting a source of D.C. voltage to the junction of said first resistive means and the cathode of said second discharge device.

2. A vertical deflection circuit as defined in claim 1 wherein in the second and third resistive means are thermistors.

No references cited.

ROY LAKE, *Primary Examiner.*